April 16, 1940.  A. S. T. LAGAARD  2,197,750
WALLBOARD FASTENER
Original Filed Oct. 27, 1937
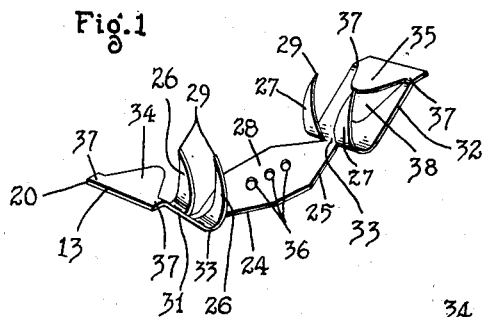
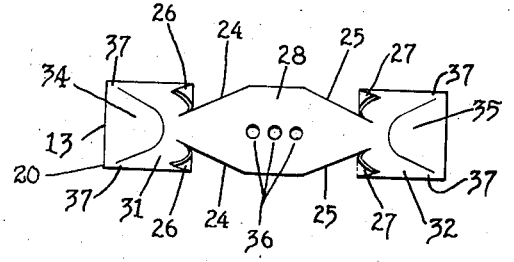
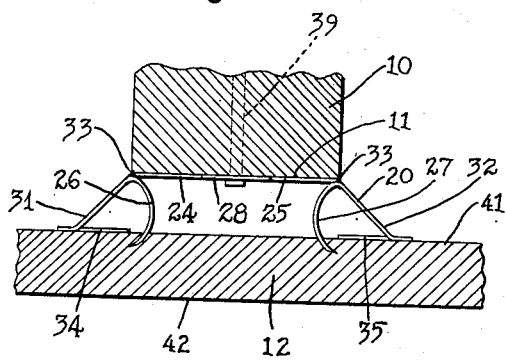
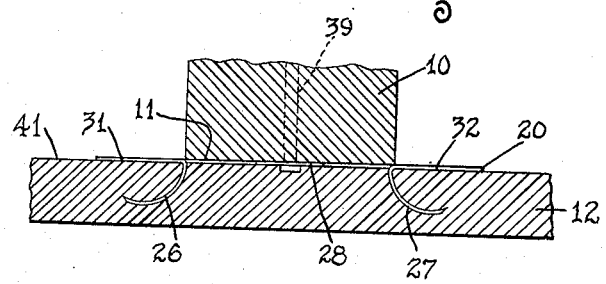
Inventor
Alexander S. T. Lagaard Patented Apr. 16, 1940

2,197,750

UNITED STATES PATENT OFFICE 2,197,750

WALLBOARD FASTENER

Alexander S. T. Lagaard, Minneapolis, Minn.

Original application October 27, 1937, Serial No. 171,209. Divided and this application February 10, 1938, Serial No. 189,799

17 Claims. (Cl. 72—118)

My invention relates to fasteners for wallboard and has for an object to provide a fastener which may be secured to the supporting structure of the wallboard and which becomes attached to the wallboard solely from the back thereof.

Another object of the invention resides in providing a fastener by means of which the wallboard may be attached to the supporting structure without lateral movement of the wallboard.

A further object of the invention resides in providing a fastener by means of which only slight distortion of the wallboard occurs in applying the wallboard to the fastener.

An object of the invention resides in providing a fastener having a plurality of prongs adapted to be forced into the wallboard in oppositely extending curved paths to prevent disengagement through lateral movement of the wallboard.

Another object of the invention resides in providing a fastener which may be attached to wood joists and in which the parts become automatically positioned in proper relation for engagement with the wallboard.

A feature of the invention resides in constructing the fastener with a base having one or more arms issuing outwardly therefrom and in attaching to said arms prongs adapted to be forced into the wallboard in diverging relation when the ends of the arms are engaged by the wallboard.

Another object of the invention resides in constructing the arms with tongues projecting outwardly therefrom and forming surfaces of extended area for engagement with the wallboard whereby the arms are readily moved to bring the prongs into engagement with the wallboard without undue distortion of the wallboard.

A still further object of the invention resides in weakening the arms at their point of connection with the base so that the arms are caused to bend at predetermined localities whereby the prongs are properly guided into the wallboard.

Another object of the invention resides in constructing the fastener of sheet metal and in forming the prongs from the marginal portion of the sheet metal.

A still further object of the invention resides in constructing the tongues from the portion of the metal forming the arms.

Other objects of the invention reside in the combination of parts and in the details of construction hereinafter illustrated and/or described.

In the drawing:

Fig. 1 is a perspective view of a fastener illustrating an embodiment of my invention.

Fig. 2 is a plan view of the fastener shown in Fig. 1.

Fig. 3 is a cross sectional view of a portion of a supporting structure, a sheet of wallboard and a fastener showing the arrangement of the parts of the fastener with respect to the supporting structure and wallboard prior to the attachment of the wallboard thereto.

Fig. 4 is a view similar to Fig. 3 showing the parts after the wallboard has been attached.

This application is a division of my co-pending application for patent for Method of and devices for installing wallboard, Serial No. 171,209, filed October 27, 1937.

In the installation of wallboard and particularly wallboard constructed of fibrous material it becomes extremely difficult to install the board without the showing of the fastening members. The present invention provides a construction whereby the wallboard may be installed without the fasteners showing from the front of the wallboard.

For the purpose of illustrating the application of my invention I have shown in Figs. 3 and 4 a portion of a wood stud 10 of dimension lumber, whose exposed face is indicated by the reference numeral 11 and to which the wallboard is to be attached. A sheet of wallboard has been shown in cross section at 12 which is applied to the stud 10 through use of a number of fasteners 20 such as illustrated in Figs. 1 and 2.

The fastener 20 is constructed from a strip of sheet metal which is sheared along diagonal converging lines 24 and 25 to form two sets of prongs 26 and 27. The lines of shears 24 and 25 extend completely through the lateral edges of strip so that the prongs 26 and 27 are formed with sharp points. By means of this construction the strip is formed with a base 28 and with arms 31 and 32 extending outwardly therefrom. The arms 31 and 32 are bent at an angle to the base 28 as shown in Fig. 3 and as indicated at 33, and project outwardly from said base. The prongs 26 and 27 are preferably curved, as shown in Figs. 1 and 3 and project outwardly from the base. These prongs are so constructed that the points 29 thereof are situated substantially opposite the bends or corners 33 formed where the said prongs are bent away from the arms 31 and 32.

Struck out of the arms 31 and 32 are tongues 34 and 35 which are bent relative to said arms so that said tongues lie substantially in a common plane. These tongues remain attached to the arms thru connecting portions 37. The holes 38 formed in the arms 31 and 32 by tongues 34 and 35 are preferably constructed a trifle larger than said tongues, so that the tongues may be readily bent back into the plane of the arms 31 and 32. The base 28 has a number of holes 36 in the same through which one or more nails may be inserted and driven into the stud 10 for attaching the fastener 20 to the same.

The manner of applying the wallboard to the studs is as follows: To the various studs are applied the fasteners 20 which are secured thereto by means of nails 39 as shown in Figs. 3 and 4. These nails are inserted through the holes 36 in the bases 28 of the fasteners and are driven into the studs by means of a nail set or any other similar tool. The fasteners 20 may extend either crosswise of the stud as shown in Figs. 3 and 4 or lengthwise thereof if desired. The sheet of wallboard to be applied is next placed in position over the various fasteners and with the rearward surface 41 thereof bearing against the tongues 34 and 35. Attachment is accomplished by placing a large block of wood such as a two foot length of studding upon the exterior surface 42 of the wall board directly in front of the facing surface 11 of the stud to which the board is to be first attached. This block is given a smart blow with a hammer. When the block overlying the board is hit with a hammer the tongues 34 and 35 bend the arms 31 and 32 about the corners 33 and cause said arms to align with the base 28.

The width of the base 28 at the bends 33 is relatively narrow so that said arms readily bend at such localities and cause the prongs to enter the wallboard. Also the width of the connecting portions 37 between the tongues 34 and 35 and arms 31 and 32 are relatively narrow. This causes the tongues 34 and 35 to readily fold back into the planes of the arms 31 and 32. In the formation of the tongues 34 and 35 the holes 38 formed in said arms, as previously described, are constructed slightly larger than the tongues so that the tongues are readily received within the same and the said tongues, arms and base all lie substantially in the plane of the surface 41 of the wallboard 12. The prong 26 being formed from the metal of the arm 31 follows with said arm as the same is straightened out and likewise the prong 27 follows with the arm 32 as said arm is straightened out. Since the points 29 of the prongs lie directly opposite the bends or corners 33 the prongs enter the wallboard along curved paths and very little distortion of the wallboard occurs. The position of the prongs after the wallboard has been installed is shown in Fig. 4 from which it will become apparent that the prongs 26 and 27 extend in opposite and diverging directions so that the same become hooked into the wallboard and attach the wallboard to the fastener 20. It will readily become apparent that the prongs 26 and 27 are of such length that the same do not project through the outer surface 42 of the wallboard during the application of the wallboard to the fastener or after the wallboard has been applied. In this manner the wallboard is rigidly secured to the studs without means of support visible from the interior of the room in which the wallboard is used. In applying the wallboard to the studs the block of wood is shifted around to the various fasteners and the fasteners straightened out gradually so as to prevent tearing of the board which might occur if one of the fasteners was completely driven in before the other fasteners were partly in place.

The advantages of my invention are manifest. By constructing the fastener from sheet metal the same can be manufactured at an economical cost and a number of prongs can be readily formed on each fastener. By arranging the prongs so that the same spread outwardly or diverge when applied to the wallboard the wallboard is securely attached through each fastener. By weakening the arms at the locality of attachment to the base the arms are caused to positively bend at predetermined locations so that the prongs can be positively directed to enter the board along predetermined curved paths. By the use of the base shown, which rests upon the wood studs the angle of the arms with respect to the wallboard is automatically determined so that it becomes impossible to improperly install the fastener or to apply the same erroneously. Thus it is possible to be assured of each fastener being positively applied to the wallboard since after the wallboard is installed it becomes impossible to correct any errors which may have been committed by the erroneous installation of the fasteners. By the use of the tongues which afford appreciable bearing area for engagement with the inner surface of the wallboard the arms are positively straightened out and with a minimum amount of distortion of the inner surface of the wallboard so that the prongs are positively directed into the wallboard and the arms completely straightened out. By means of the construction shown the fasteners can be constructed without waste of material. By symmetrically disposing the prongs with reference to the base, lateral stresses are overcome so that the fastener has no tendency to twist or cause the prongs to enter the wallboard in a crooked direction.

Having described my invention what I consider as new and desire to protect by Letters Patent is:

1. A wallboard fastener comprising a base for attachment to a support, an arm issuing angularly from said base and extending outwardly from said support, and adapted to be swung back toward said support, two prongs, one on each side of said arm, said prongs extending transversely of the wallboard and being movable with said arm, and pressure transmitting means on said arm symmetrically disposed with reference to said prongs and for engagement with the inner surface of the wallboard, said means upon receiving pressure thru the wallboard swinging the arm back toward the wallboard and hooking the prongs into the wallboard.

2. A wallboard fastener comprising a base, an arm issuing angularly from each end of said base, said arms diverging with respect to one another, prongs on said arms extending transversely of the wallboard, and pressure transmitting means on each arm for engagement with the inner surface of the wallboard, said means upon receiving pressure thru the wallboard swinging said arms toward the support and said prongs away from each other to cause the prongs to hook into the wallboard in diverging relation.

3. A wallboard fastener constructed from a strip of sheet metal bent transversely intermediate its ends at spaced localities to form a planiform base adapted to be attached to a support and two arms issuing outwardly therefrom in diverging relation, prongs struck out of the base and issuing from and movable with said arms, said prongs extending transversely of the wallboard, and tongues struck out of said arms and extending from the ends thereof and lying substantially in the plane of the wallboard, said tongues engaging the inner surface of the wallboard and upon receiving pressure thru the wallboard swinging said arms toward the support and hooking the prongs into the wallboard.

4. A wallboard fastener constructed from a strip of sheet metal bent transversely intermediate its ends at spaced localities to form a planiform base adapted to be attached to a support and two arms issuing outwardly therefrom in diverging relation, pairs of prongs struck out of said base by converging cuts extending from the lateral edges of the strip to the bends, said prongs being bent relative to the base along lines closely positioned to the bends of the arms and extending transversely of the wallboard, said prongs weakening the strip at the bends of the arms and tongues struck out of said arms and extending outwardly from the ends of the arms, said tongues substantially lying in the plane of the inner surface of the wallboard, said tongues engaging the inner surface of the wallboard and upon receiving pressure thru the wallboard swinging said arms toward the support and hooking the prongs into the wallboard.

5. A wallboard fastener constructed of sheet metal and comprising a stationary base for attachment to the face of a support, an arm extending angularly from said base and being integral therewith, a prong carried by said arm and adapted to enter the wallboard said arm and prong being formed by a cut extending inwardly from an edge of the base, pressure transmitting means on said arm for engagement with the inner surface of the wall board, said means upon receiving pressure through the wallboard swinging the arm back toward the wallboard and hooking the prong into the wallboard, said cut being disposed to cause said arm at its locality of issuance from said base to be narrower than at a locality immediately adjoining said locality to cause said arm to bend in the locality of the face of the support to bring said arm into the plane of the base when the arm is swung back toward the wallboard.

6. A wallboard fastener constructed from a strip of sheet metal comprising a base for attachment to a support, said strip being bent transversely thereof to form an arm extending angularly therefrom, said strip being severed in the locality of said bend to weaken the arm at such locality and permit the arm to bend back into the plane of the base at the bend, a prong carried by said arm and formed by said severance and pressure transmitting means on said arm for moving the arm into the plane of the base and hooking the prong into the wallboard.

7. A wallboard fastener constructed from a strip of sheet metal comprising a base for attachment to a support, said strip being bent transversely thereof to form an arm extending angularly therefrom, said strip being severed in the locality of said bend to weaken the arm at such locality and permit the arm to bend back into the plane of the base at the bend, a prong formed from the severed portion of said strip and movable with said arm and pressure transmitting means on said arm for swinging the arm back toward the wallboard and hooking the prong into the wallboard.

8. A wallboard fastener comprising a stationary attaching member for attachment to the face of a support, an arm carried by said attaching member and extending angularly from said support, a prong fixed relative to said arm and engaging the inner surface of the wallboard, and a pressure transmitting member of extended area carried by said arm and parallel with the surface of the wallboard in engagement with the inner surface of the wallboard, said member upon receiving pressure through the wallboard swinging the arm back toward the wallboard and hooking the prong into the wallboard.

9. A wallboard fastener comprising a stationary attaching member for attachment to the face of a support, an arm carried by said attaching member and extending angularly from said support, a prong fixed relative to said arm and engaging the inner surface of the wallboard, a plate of extended area carried by said arm and having one surface in engagement with the inner surface of the wallboard, said plate upon receiving pressure through the wallboard swinging the arm back toward the wallboard and hooking the prong into the wallboard.

10. A wallboard fastener comprising a stationary attaching member for attachment to the face of a support, an arm carried by said attaching member and extending angularly from said support, a prong fixed relative to said arm and engaging the inner surface of the wallboard, and a pressure transmitting member pivoted to said arm for engagement with the inner surface of the wallboard, said pressure transmitting member following along the surface of the wallboard as pressure is applied to the wallboard and swinging the arm back toward the wallboard and hooking the prong into the wallboard.

11. A wallboard fastener comprising a stationary attaching member for attachment to the face of a support, an arm carried by said attaching member and extending angularly from said support, a prong fixed relative to said arm and engaging the inner surface of the wallboard, a plate pivoted to said arm for engagement with the inner surface of the wallboard, said plate following along the inner surface of the wallboard upon receiving pressure from the same and swinging the arm back toward the wallboard for hooking the prong into the wallboard.

12. A wallboard fastener constructed from a strip of sheet metal bent transversely intermediate its ends at spaced localities to form a planiform base therebetween, adapted to be attached to a support and two arms issuing angularly outwardly therefrom in diverging relation, pairs of prongs struck out of said base by converging cuts commencing near the center of the base and extending from the lateral edges of the strip in converging relation inwardly to the bends, said prongs being bent relatively to the base along lines closely positioned to the bends of the arms and extending laterally of the base, said arms being connected to the base through the portions thereof intermediate the prongs, said portions being narrower than the intervening portions of the base to cause the arms to bend at said bends and tongues struck out of said arms and extending inwardly from the ends of the arms, said tongues being formed by cuts having their ends disposed in close proximity to the lateral edges of the arms and said tongues substantially lying in the plane of the inner surface of the wallboard, the width of said tongues at the ends of said cuts being greater than the width of the remainder of the arms at the ends of the cuts to cause the tongues to bend freely relative to the arms, said tongues engaging the inner surface of the wallboard and upon receiving pressure of the wallboard swinging said arms toward the support and hooking the prongs into the wallboard.

13. A wallboard fastener constructed from a strip of metal bent transversely to form a planiform base adapted to be attached to a support and an arm issuing angularly outwardly therefrom, a prong carried by said arm and moveable therewith and a tongue struck out of said arm and extending inwardly from the end of the arm, said tongue being formed by a cut having its ends disposed in close proximity to the lateral edges of the arm, said tongue being of a width at the ends of said cut greater than the width of the remainder of the arm at said locality to cause said tongue to bend freely relative to the arm, said tongue engaging the inner surface of the wallboard and upon receiving pressure through the wallboard swinging said arm toward the support and hooking the prong into the wallboard.

14. A wallboard fastener comprising an attaching member for attachment to a support, an arm carried by said attaching member and extending outwardly from the said support, said arm being adapted to be swung back toward the support, a prong movable with said arm and extending laterally of the wallboard, and a plate pivoted to said arm and adapted to engage the inner surface of the wallboard and to slide along the same, said plate upon receiving pressure through the wallboard swinging the arm back toward the support and sliding along the wallboard to cause the prong to hook into the wallboard, said plate throughout its movement remaining substantially parallel with the surface of the wallboard.

15. A wallboard fastener comprising a member for attachment to a support, an arm issuing outwardly from said member and disposed angularly with reference to the wallboard, said arm being adapted to be swung back toward the support, two prongs, one on each side of said arm, said prongs extending transversely of the wallboard and being movable with said arm, and pressure transmitting means on said arm symmetrically disposed with reference to said prongs for engagement with the inner surface of the wallboard, said means upon receiving pressure through the wallboard swinging the arm back toward the wallboard and hooking the prongs into the wallboard.

16. A wallboard fastener comprising a member for attachment to a support, an arm issuing outwardly from said member and disposed angularly with reference to the wallboard, said arm being adapted to be swung back toward the support, a prong integral with said arm and issuing from the same at the locality of issuance of the arm from the member, and pressure transmitting means on said arm for engagement with the inner surface of the wallboard, said means upon receiving pressure through the wallboard swinging the arm back toward said support and hooking the prong into the wallboard.

17. A wallboard fastener comprising an attaching member for attachment to a support, two arms issuing outwardly from said member and disposed in divergent relation relative to each other, prongs on said arms extending transversely of the wallboard, and pressure transmitting means on each arm for engagement with the inner surface of the wallboard, said means upon receiving pressure through the wallboard swinging said arms toward the support and said prongs away from each other to cause the prongs to hook into the wallboard in diverging relation.

ALEXANDER S. T. LAGAARD.